(12) United States Patent
Trujillo et al.

(10) Patent No.: US 11,475,040 B2
(45) Date of Patent: Oct. 18, 2022

(54) MANAGING DATA REPLICATION SESSIONS IN RESPONSE TO AN INABILITY TO ACCESS A STORAGE VOLUME

(71) Applicant: International Business Machines Corporation, Armonk, NY (US)

(72) Inventors: Damian Trujillo, Pima, AZ (US); Anthony Ciaravella, Tucson, AZ (US); Pamela Schull, Tucson, AZ (US); Gregory E. McBride, Vail, AZ (US); William J. Rooney, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 645 days.

(21) Appl. No.: 16/242,916

(22) Filed: Jan. 8, 2019

(65) Prior Publication Data
US 2020/0218731 A1 Jul. 9, 2020

(51) Int. Cl.
*G06F 16/27* (2019.01)

(52) U.S. Cl.
CPC .................................. *G06F 16/27* (2019.01)

(58) Field of Classification Search
CPC ....................................................... G06F 16/27
See application file for complete search history.

(56) References Cited

U.S. PATENT DOCUMENTS

| 6,944,785 | B2 | 9/2005 | Gadir et al. |
| 7,117,386 | B2 | 10/2006 | LeCrone et al. |
| 7,373,472 | B2 | 5/2008 | Bhasin et al. |
| 7,383,463 | B2 | 6/2008 | Hayden et al. |
| 7,769,722 | B1 * | 8/2010 | Bergant ................ G06F 16/125 707/681 |
| 8,862,541 | B1 | 10/2014 | Cox et al. |
| 8,909,985 | B2 | 12/2014 | Sutton et al. |
| 8,914,671 | B2 | 12/2014 | Rooney et al. |
| 9,305,009 | B1 * | 4/2016 | Bono ..................... G06F 16/178 |
| 2005/0015436 | A1 * | 1/2005 | Singh ..................... G06F 16/27 707/999.01 |
| 2006/0047928 | A1 | 3/2006 | Bhasin et al. |
| 2006/0190243 | A1 * | 8/2006 | Barkai .................. G06F 16/278 704/8 |
| 2016/0313935 | A1 * | 10/2016 | Blea ........................ G06F 11/14 |

(Continued)

FOREIGN PATENT DOCUMENTS

| EP | 1420350 A2 | 5/2004 |
| WO | 2006026609 A8 | 8/2008 |

OTHER PUBLICATIONS

EMC, "Implementing TimeFinder VP Snap for Local Replication, Applied technology for thin environments on Symmetrix VMAX Family systems," EMC Corporation, Whitepaper, 2013, 38 pages, retrieved from https://www.emc.com/collateral/hardware/white-papers/h10498-timefinder-vp-snap-local-repl-wp.pdf.

(Continued)

*Primary Examiner* — Van H Oberly
(74) *Attorney, Agent, or Firm* — Zilka-Kotab, P.C.

(57) ABSTRACT

A computer-implemented method according to one approach includes identifying an inability to access a first storage volume during a first data replication session, creating a second data replication session including the first storage volume, and removing the first storage volume from the first data replication session.

20 Claims, 8 Drawing Sheets

(56) References Cited

U.S. PATENT DOCUMENTS

2017/0329834 A1* 11/2017 O'Neill ................... G06F 16/27
2018/0095851 A1    4/2018 Zhang et al.
2018/0352037 A1* 12/2018 Shang ................... H04L 67/148
2020/0089579 A1*  3/2020 Pradhan ................. H04L 67/60

OTHER PUBLICATIONS

Nasios et al., "Kernel-based classification using quantum mechanics," Science Direct, Pattern Recognition, vol. 40, 2007, pp. 875-889.

* cited by examiner

MANAGING DATA REPLICATION SESSIONS IN RESPONSE TO AN INABILITY TO ACCESS A STORAGE VOLUME

BACKGROUND

The present invention relates to data replication, and more specifically, this invention relates to creating a second data replication session to handle storage volume failure or access problems in a first data replication session.

Data replication and associated swap functionality is currently session based, with one or more source storage volumes and destination storage volumes being managed for swapping. These managed volumes may be across one or more storage systems.

Currently, when an operating system detects a swap trigger, the entire data replication session is swapped, with all the managed source and destination storage volumes being swapped, independent of which storage system they are on. However, if the event that triggered the swap was due to a storage system issue, the volumes on other storage systems within the data replication session may not need to be swapped, which may result in unnecessary processing and resource utilization during the performance of the swap (as well as potentially undesired swapping). This means more volumes are swapped than necessary, which may result in a greater delay for volume availability to applications as volumes are not available during the swap. In addition, volumes that are on storage systems that do not have problems are impacted.

There is therefore a need for an automated way to implement data replication session swapping with a greater level of granularity.

SUMMARY

A computer-implemented method according to one approach includes identifying an inability to access a first storage volume during a first data replication session, creating a second data replication session including the first storage volume, and removing the first storage volume from the first data replication session.

According to another approach, a computer program product for managing data replication sessions in response to an inability to access a storage volume includes a computer readable storage medium that has program instructions embodied therewith, where the computer readable storage medium is not a transitory signal per se, and where the program instructions are executable by a processor to cause the processor to perform a method including identifying, utilizing the processor, an inability to access a first storage volume during a first data replication session, creating, utilizing the processor, a second data replication session including the first storage volume, and removing, utilizing the processor, the first storage volume from the first data replication session.

In another approach, the first storage volume is paired with a second storage volume within the first data replication session as a replication pairing, and the replication pairing is swapped within the second data replication session.

In this way, the second data replication session may perform data replication utilizing the swapped replication pairing, and may therefore manage the replication of data stored within the second storage volume to a restored first storage volume. This may minimize an amount of replication pairings that need to be swapped in response to the inability to access the first storage volume, which may reduce an amount of processing performed during the data replication sessions, and may improve a performance of one or more systems implementing the data replication sessions.

In another approach, the second data replication session is merged with the first data replication session.

In this way, the first data replication session may be restored, and the second data replication session may be removed, which may reduce a processing load (e.g. an operating system (OS) load including the loading of data replication sessions, etc.) and improve a performance of one or more systems implementing the data replication sessions.

A system according to another approach includes a processor, and logic integrated with the processor, executable by the processor, or integrated with and executable by the processor, where the logic is configured to identify an inability to access a first storage volume during a first data replication session, create a second data replication session including the first storage volume, and remove the first storage volume from the first data replication session.

Other aspects and approaches of the present invention will become apparent from the following detailed description, which, when taken in conjunction with the drawings, illustrate by way of example the principles of the invention.

DETAILED DESCRIPTION

The following description discloses several preferred approaches of systems, methods and computer program products for managing data replication sessions in response to an inability to access a storage volume. Various approaches provide a method to create a second data replication session in response to an inability to access a storage volume within a first data replication session, where the storage volume is transferred to the second data replication session.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "includes" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred approaches of systems, methods and computer program products for managing data replication sessions in response to an inability to access a storage volume.

In one general approach, a computer-implemented method includes identifying an inability to access a first storage volume during a first data replication session, creating a second data replication session including the first storage volume, and removing the first storage volume from the first data replication session.

In another general approach, a computer program product for managing data replication sessions in response to an inability to access a storage volume includes a computer readable storage medium that has program instructions embodied therewith, where the computer readable storage medium is not a transitory signal per se, and where the program instructions are executable by a processor to cause the processor to perform a method including identifying, utilizing the processor, an inability to access a first storage volume during a first data replication session, creating, utilizing the processor, a second data replication session including the first storage volume, and removing, utilizing the processor, the first storage volume from the first data replication session.

In another general approach, a system includes a processor, and logic integrated with the processor, executable by the processor, or integrated with and executable by the processor, where the logic is configured to identify an inability to access a first storage volume during a first data replication session, create a second data replication session including the first storage volume, and remove the first storage volume from the first data replication session.

Figure 1:
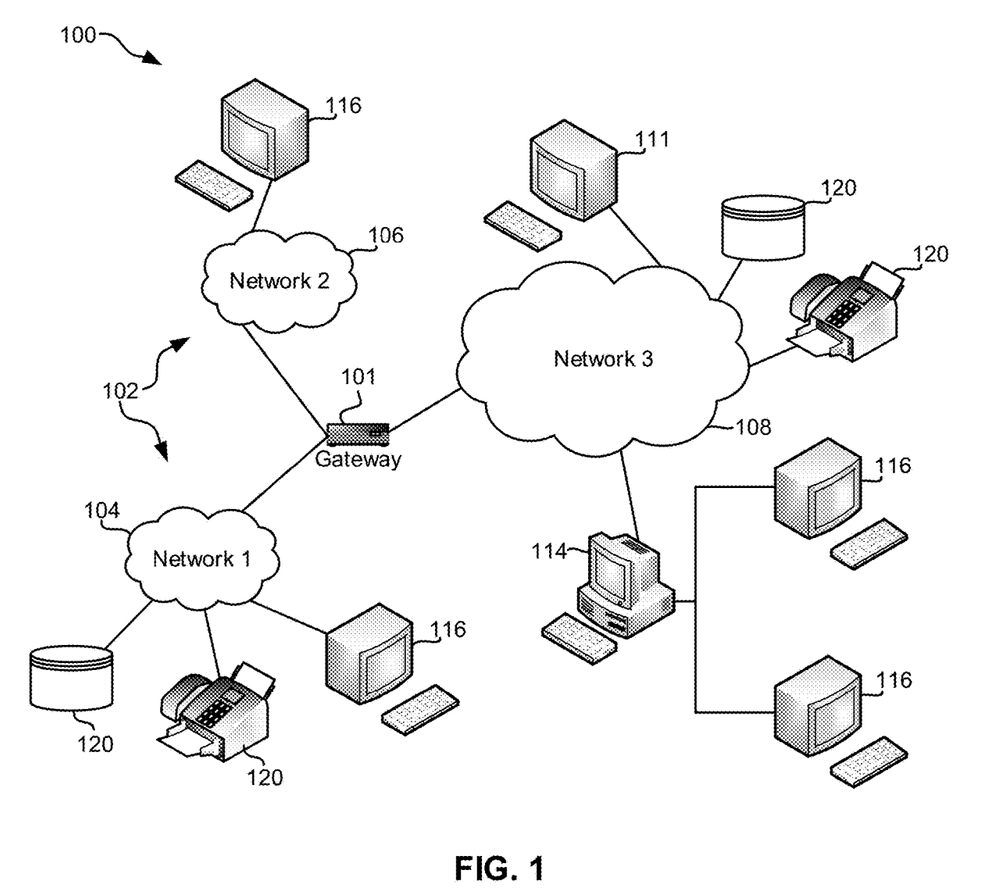
FIG. 1 illustrates a network architecture, in accordance with one approach.

FIG. 1 illustrates an architecture 100, in accordance with one approach. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one approach.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some approaches.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
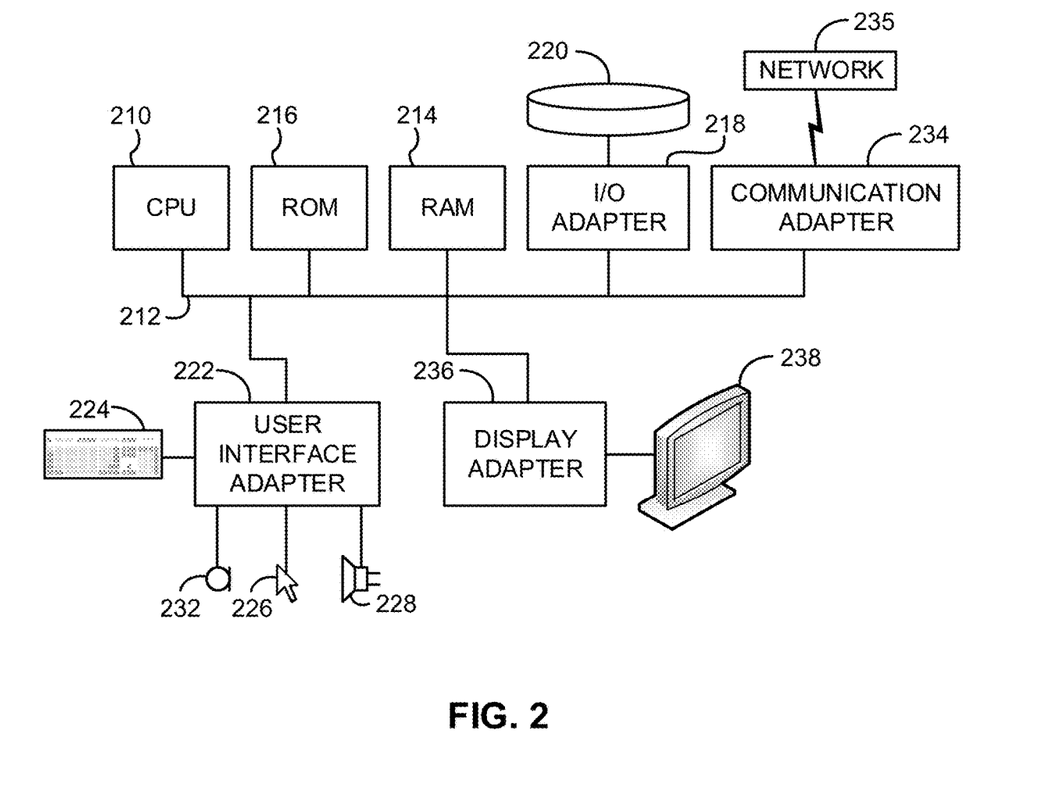
FIG. 2 shows a representative hardware environment that may be associated with the servers and/or clients of FIG. 1, in accordance with one approach.

FIG. 2 shows a representative hardware environment associated with a user device 116 and/or server 114 of FIG. 1, in accordance with one approach. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred approach may also be implemented on platforms and operating systems other than those mentioned. A preferred approach may be written using XML, C, and/or C++ language, or other programming languages, along with an object oriented programming methodology. Object oriented programming (OOP), which has become increasingly used to develop complex applications, may be used.

Figure 3:
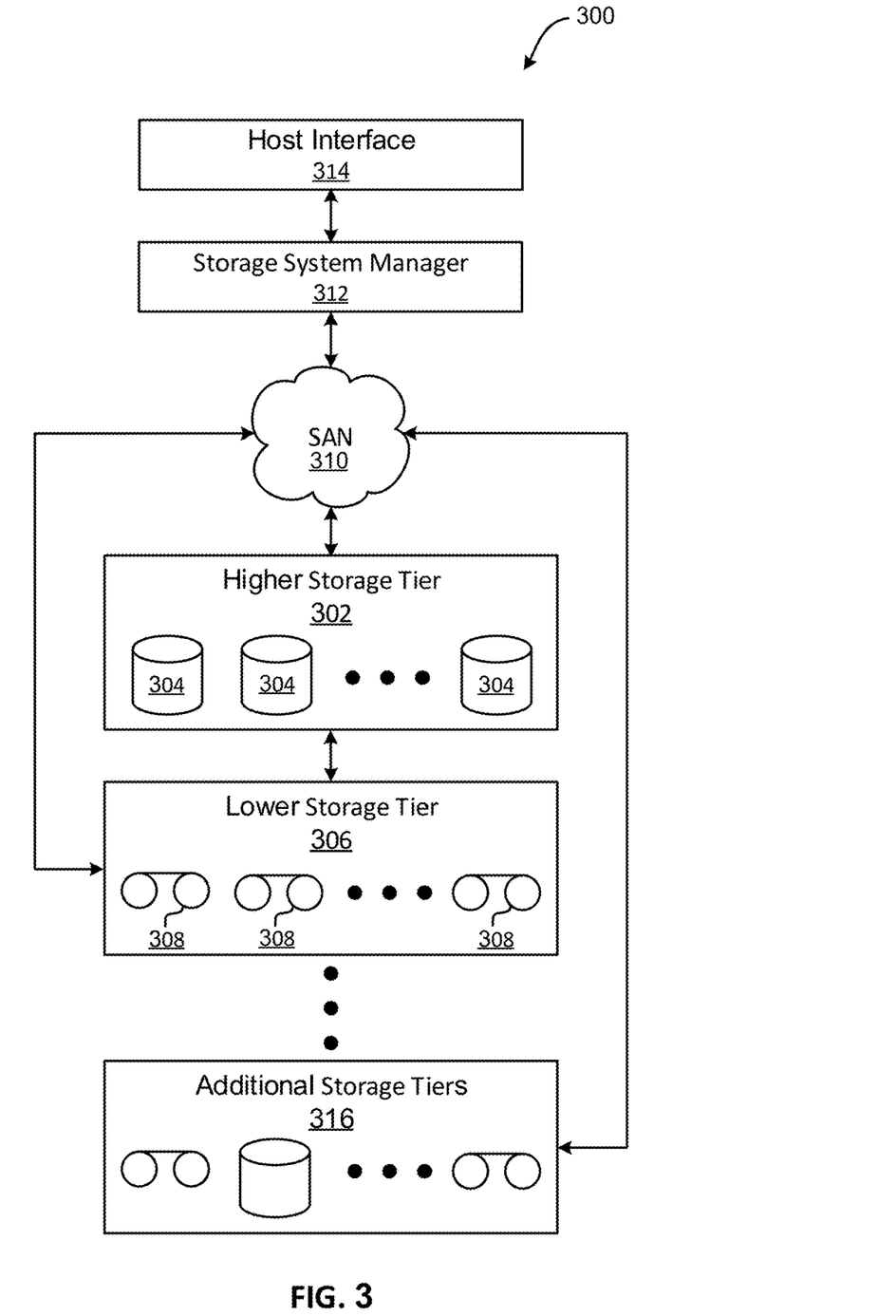
FIG. 3 illustrates a tiered data storage system in accordance with one approach.

Now referring to FIG. 3, a storage system 300 is shown according to one approach. Note that some of the elements shown in FIG. 3 may be implemented as hardware and/or software, according to various approaches. The storage system 300 may include a storage system manager 312 for communicating with a plurality of media on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more approaches, the storage system 300 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the approaches presented herein.

According to some approaches, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various approaches.

Figure 4:
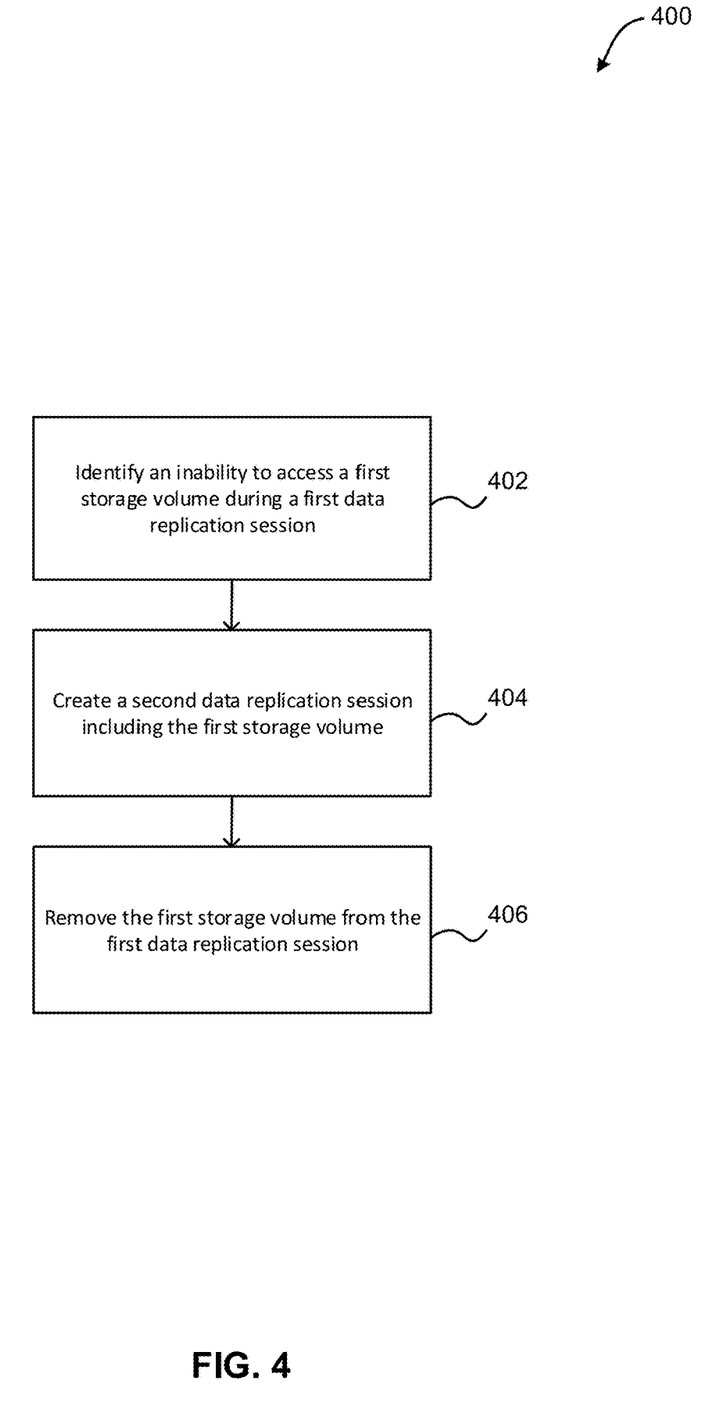
FIG. 4 illustrates a method for managing data replication sessions in response to an inability to access a storage volume, in accordance with one approach.

Now referring to FIG. 4, a flowchart of a method 400 is shown according to one approach. The method 400 may be performed in accordance with the present invention in any of the environments depicted in FIGS. 1-3 and 5A-C, among others, in various approaches. Of course, more or less operations than those specifically described in FIG. 4 may be included in method 400, as would be understood by one of skill in the art upon reading the present descriptions.

Each of the steps of the method 400 may be performed by any suitable component of the operating environment. For example, in various approaches, the method 400 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 4, method 400 may initiate with operation 402, where an inability to access a first storage volume is identified during a first data replication session. In one approach, the first storage volume may include a storage drive (e.g., a hard disk drive, a tape drive, a solid state drive, etc.). In another approach, the first storage volume may be located within a storage system. For example, the storage system may include a computing device that provides data storage and retrieval services. In another example, the storage system may include a plurality of different storage volumes.

Additionally, in one approach, the first storage volume may be paired with/mapped to a second storage volume within the first data replication session. For example, the first data replication session may replicate data stored within the first storage volume (e.g., the source storage volume) to the second storage volume (e.g., a destination storage volume). In another approach, the first data replication session may include a data transfer session where data is replicated from the first storage volume of a first storage system to the second storage volume of a second storage system.

Further, data stored at a third storage volume of the first storage system may be replicated to a fourth storage volume of the second storage system. For example, data written to the first storage volume of the first storage system may be replicated to the second storage volume of the second storage system during the data replication session. Likewise, data written to the third storage volume of the first storage system may be replicated to the fourth storage volume of the second storage system during the data replication session.

Further still, in one approach, the data replication session may include logical device swapping (e.g., a HyperSwap® session, etc.). For example, the first storage system may be located at a different location/site from the second storage system. In another approach, the inability to access the first storage volume may include an inability to access data within the first storage volume resulting from a failure of the first storage volume such as one or more of a hardware failure, a software failure (e.g., one or more software errors), a power failure, a communications failure, etc. In yet another approach, the inability to access the first storage volume may put a destination storage volume paired with the first storage volume in a predetermined state within the first data replication session (e.g., a failed over primary suspended state) by the logical device swapping.

In another approach, the inability to access the first storage volume may include an inability to access data within the first storage volume resulting from a network failure (e.g., a SAN failure, etc.). For example, a SAN that connects a plurality of storage systems including the first storage system and the second storage system may experience one or more errors, such that the first storage volume is not accessible via the SAN. In another example, a first SAN may connect one or more storage systems including the first storage system, and a second SAN may connect one or more storage systems including the second storage system. Additionally, the first SAN may experience one or more errors, such that the first storage volume is not accessible via the SAN.

Also, method 400 may proceed with operation 404, where a second data replication session including the first storage volume is created. In one approach, the second data replication session may be separate from the first data replication session. For example, the first data replication session may be created on a first operating system (OS) load, and the second data replication session may be created on a second operating system (OS) load different from the first operating system (OS) load.

In addition, in one approach, the second data replication session may be created (e.g., defined) in response to the inability to access the first storage volume. In another approach, the second data replication session may be created (e.g., defined and run) in response to the inability to access the first storage volume, and the subsequent recovery of the first storage volume. In yet another approach, the second data replication session may include the second storage volume (e.g., the destination storage volume paired with the first storage volume).

Furthermore, in one approach, the first storage volume may be paired with/mapped to the second storage volume within the first data replication session as a replication pairing. For example, the replication pairing may be swapped within the second data replication session. In another example, the second data replication session may replicate data stored within the second storage volume to the first storage volume. In yet another example, the swapped replication pairing may be added to the second data replication session.

Further still, in one approach, the second data replication session may include a data transfer session where data is replicated from the second storage volume of the second storage system to the first storage volume of the first storage system. In another approach, input and output (I/O) directed to the first storage volume may be redirected to the second storage volume within the second data replication session, in response to identifying the inability to access the first storage volume. For example, this redirecting of I/O may be performed within the first data replication session. In another example, this redirecting of I/O may be maintained when the second data replication session is created including the first storage volume and the second storage volume.

Also, in one approach, the first data replication session may be maintained during and after the creation of the second data replication session. In another approach, the first storage volume and the second storage volume may be removed from the first data replication session, and added to the second data replication session, by changing one or more database associations. For example, the first storage volume and the second storage volume may be removed from a database defining the first data replication session, and may be added to a database defining the second data replication session.

Additionally, method 400 may proceed with operation 406, where the first storage volume is removed from the first data replication session. In one approach, the first data replication session may perform a replication of data from a plurality of source storage volumes to a plurality of respective destination storage volumes (e.g., according to a plurality of replication pairings). In another approach, before the inability to access the first storage volume, the first storage volume may be included within the plurality of source volumes, and data may be replicated to the second volume, which is included within the plurality of destination storage volumes.

Further, in one approach, upon identifying the failure of the first storage volume, the replication pairing including the first storage volume and the second storage volume may be removed from the first data replication session. For example, the first storage volume may be removed from the plurality of source storage volumes within the first data replication session, and the second storage volume may be removed from the plurality of destination storage volumes within the first data replication session.

In this way, a second data replication session may perform data replication utilizing the swapped replication pairing, and may therefore manage the replication of data stored within the second storage volume (e.g., the new source storage volume) to the restored first storage volume (e.g., the new destination storage volume). This may minimize an amount of replication pairings that need to be swapped in response to the inability to access the first storage volume, which may reduce an amount of processing performed during the data replication sessions, and may improve a performance of one or more systems implementing the data replication sessions.

Further still, in one approach, the second data replication session may be merged (e.g., coalesced) with the first data replication session. For example, the swapped replication pairing may be suspended, and restarted in the opposite direction (e.g., the original direction before the failure of the first storage volume). In another example, the second data replication session may replicate data stored within the first storage volume to the second storage volume.

Also, in one example, input and output (I/O) redirected to the second storage volume may be again directed to the first storage volume within the second data replication session. In another example, the restarted replication pairing may be added to the first data replication session, and removed from the second data replication session. For instance, the second data replication session may be terminated.

In this way, the first data replication session may be restored, and the second data replication session may be removed, which may reduce a processing load (e.g. an operating system (OS) load including the loading of data replication sessions, etc.) and improve a performance of one or more systems implementing the data replication sessions.

Figure 5A:
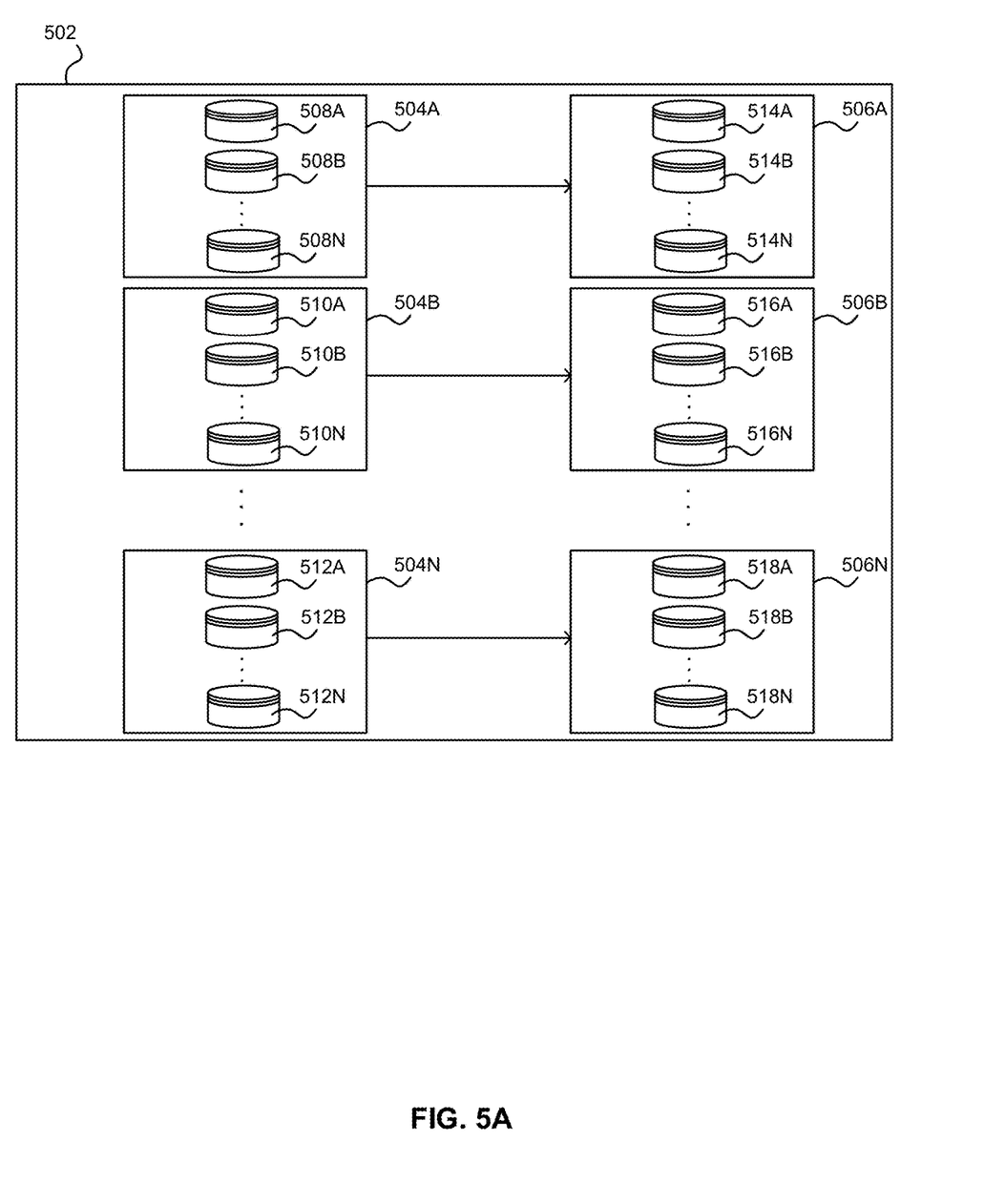
FIG. 5A illustrates an exemplary data replication environment prior to an inability to access a storage system, in accordance with one approach.

FIG. 5A illustrates an exemplary data replication environment 500 prior to an inability to access a storage system, according to one exemplary approach. As shown, a first data replication session 502 is running that includes a plurality of source storage systems 504A-N paired with a plurality of destination storage systems 506A-N. More specifically, source storage system 504A is paired with destination storage system 506A, source storage system 504B is paired with destination storage system 506B, and source storage system 504N is paired with destination storage system 506N.

Additionally, in one approach, storage actions are performed by the plurality of source storage systems 504A-N paired with the plurality of destination storage systems 506A-N according to a configuration for the first data replication session 502. For example, input and output requests (e.g., read requests, write requests, modify requests, etc.) sent from one or more external systems and/or applications may be directed to the plurality of source storage systems 504A-N. Additionally, changes made to the plurality of source storage systems 504A-N may be replicated to the plurality of destination storage systems 506A-N, based on their associated pairings.

For example, changes made to data within source storage system 504A may be replicated at destination storage system 506A, changes made to data within source storage system 504B may be replicated at destination storage system 506B, and changes made to data within source storage system 504N may be replicated at destination storage system 506N.

Further, in one approach, each of the plurality of source storage systems 504A-N include a plurality of source storage volumes 508A-N, 510A-N, and 512A-N that are paired with destination storage volumes 514A-N, 516A-N, and 518A-N included within destination storage systems 506A-N. For example, changes made to data within source storage volume 508A may be replicated at destination storage volume 514A, changes made to data within source storage volume 510A may be replicated at destination storage volume 516A, changes made to data within source storage volume 512A may be replicated at destination storage volume 518A, etc.

In this way, the first data replication session 502 manages data transfer to and from the plurality of source storage systems 504A-N, while managing data replication to the plurality of destination storage systems 506A-N.

Figure 5B:
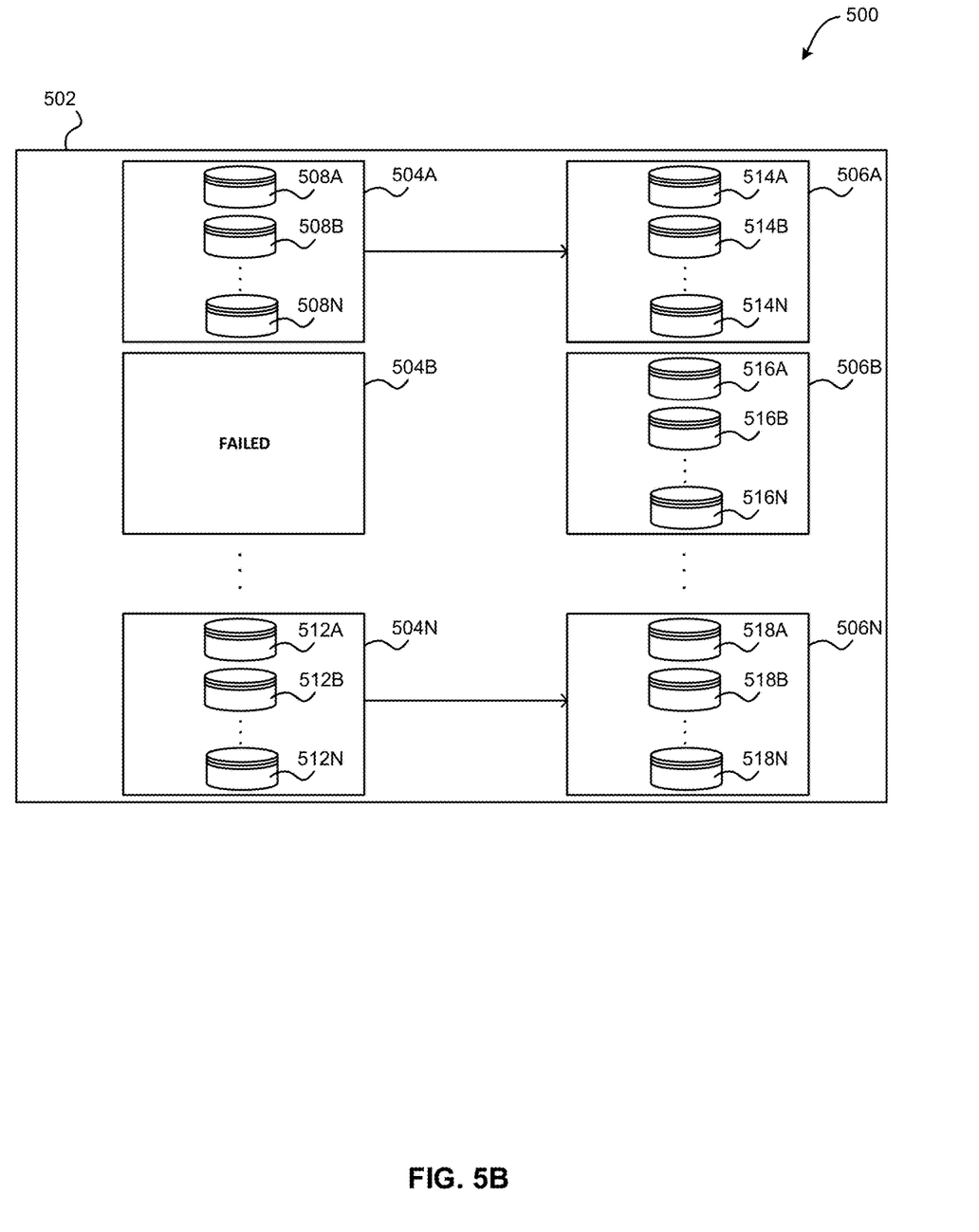
FIG. 5B illustrates the exemplary data replication environment of FIG. 5A after an inability to access a source storage system, in accordance with one approach.

FIG. 5B illustrates the exemplary data replication environment 500 of FIG. 5A after an inability to access a source storage system 504B, according to one exemplary approach. As shown, in response to the failure of or loss of access to the source storage system 504B, input and output requests sent from one or more external systems and/or applications are redirected via logical device swapping from the failed source storage system 504B to paired destination storage system 506B. In one approach, I/O sent to source storage volume 510A may be redirected to destination storage volume 516A, I/O sent to source storage volume 510B may be redirected to destination storage volume 516B, I/O sent to source storage volume 510N may be redirected to destination storage volume 516N, etc.

It should be noted that only a portion of the source storage system 504B may fail (e.g., a logical control unit/logical subsystem containing one or more source storage volumes 510A-N, etc.). In this case, only input and output requests sent from one or more external systems and/or applications to the specific failed portion of the source storage system 504B (e.g., the failed portion of source storage volumes 510A-N, etc.) may be redirected from the failed source storage system 504B to their respective paired portion of the destination storage system 506B (e.g., one or more destination storage volumes 516A-N, etc.) and therefore moved into the second data replication session.

Figure 5C:
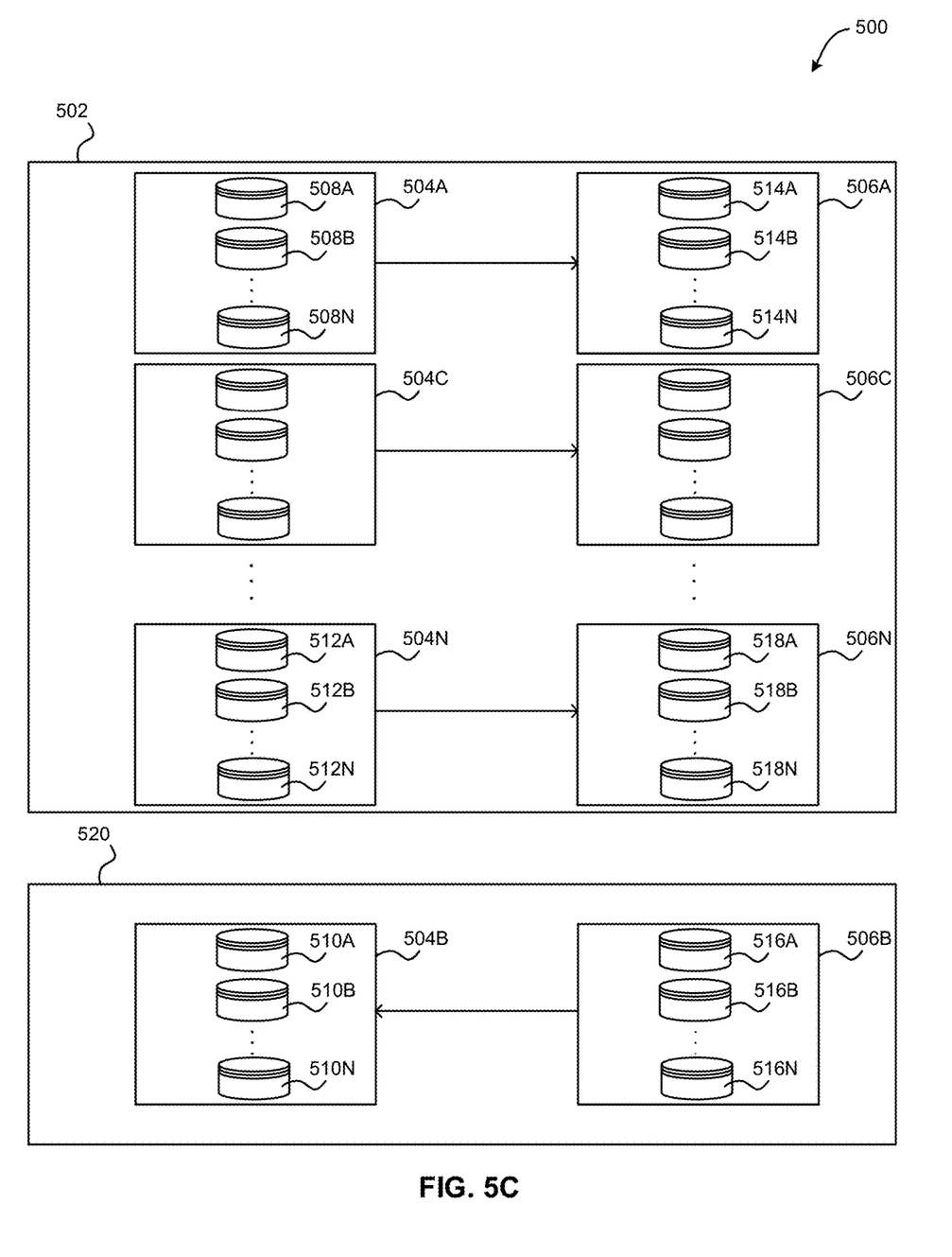
FIG. 5C illustrates data replication session splitting within the exemplary data replication environment of FIG. 5A after an inability to access a source storage system, in accordance with one approach.

FIG. 5C illustrates data replication session splitting within the exemplary data replication environment 500 of FIG. 5A after an inability to access a source storage system 504B, according to one exemplary approach. As shown, in response to the inability to access the source storage system 504B, the failed source storage system 504B and the paired destination storage system 506B are removed from the first data replication session 502.

Additionally, a second data replication session 520 is created that is separate from the first data replication session 502. Further, in one approach, in response to determining that a restored source storage system 504B is available, the destination storage system 506B and the paired restored source storage system 504B are added to the second data replication session 520. In another approach, the destination storage system 506B and the paired restored source storage system 504B may be added to the second data replication session 520 in response to the removal of the failed source storage system 504B and the paired destination storage system 506B from the first data replication session 502, and the second data replication session 520 may be started in response to determining that a restored source storage system 504B is available.

Further, since in FIG. 5B input and output requests sent from one or more external systems and/or applications are redirected from the failed source storage system 504B to paired destination storage system 506B, in the second data replication session 520, input and output requests sent from one or more external systems and/or applications are directed to the destination storage system 506B. Additionally, changes made to the destination storage system 506B are replicated to the restored source storage system 504B. In this way, in the configuration shown in FIG. 5C, the destination storage system 506B now acts as a source storage system, and the restored source storage system 504B now acts as a destination storage system.

In this way, the second data replication session 520 manages the destination storage system 506B and the paired restored source storage system 504B separately from the first data replication session 502 managing the remaining plurality of source storage systems 504A and 504N paired with the plurality of destination storage systems 506A and 506N.

In one example, if only a portion of the source storage system 504B fails (e.g., a portion of source storage volumes 510A-N, etc.), only the failed/restored portions and their respective paired portions of the destination storage system 506B (e.g., one or more destination storage volumes 516A-N, etc.) may be added to the second data replication session 520. In this example, unaffected source and destination storage volumes within the source storage system 504B and the destination storage system 506B may remain in the first data replication session 502.

In one approach, the second data replication session 520 may be merged (e.g., coalesced, etc.) with the first data replication session 502. For example, the destination storage system 506B (which is acting in FIG. 5C as a source storage system) and the paired restored source storage system 504B (which is acting in FIG. 5C as a destination storage system) may be swapped within the second data replication session 520 so that the input and output requests sent from one or more external systems and/or applications are again directed to the source storage system 504B, and changes made to the source storage system 504B are again replicated to the destination storage system 506B. Additionally, in one approach, the destination storage system 506B and the paired restored source storage system 504B may be removed from the second data replication session 520 and added to the first data replication session 502.

In another approach, the first data replication session 502 may be merged (e.g., coalesced, etc.) with the second data replication session 520. For example, the destination storage system 506A and 506C-N and the paired source storage systems 504A and 504C-N may be swapped within the first data replication session 502 so that the input and output requests sent from one or more external systems and/or applications are directed to the destination storage system 506A and 506C-N, and changes made to the destination storage system 506A and 506C-N are replicated to the source storage system 504A and 504C-N. Additionally, the destination storage system 506A and 506C-N and the paired source storage systems 504A and 504C-N may be removed from the first data replication session 502 and added to the second data replication session 520.

Further still, in one approach, the second data replication session 520 may then be removed. In this way, the exemplary data replication environment 500 shown in FIG. 5A may be restored.

Figure 6:
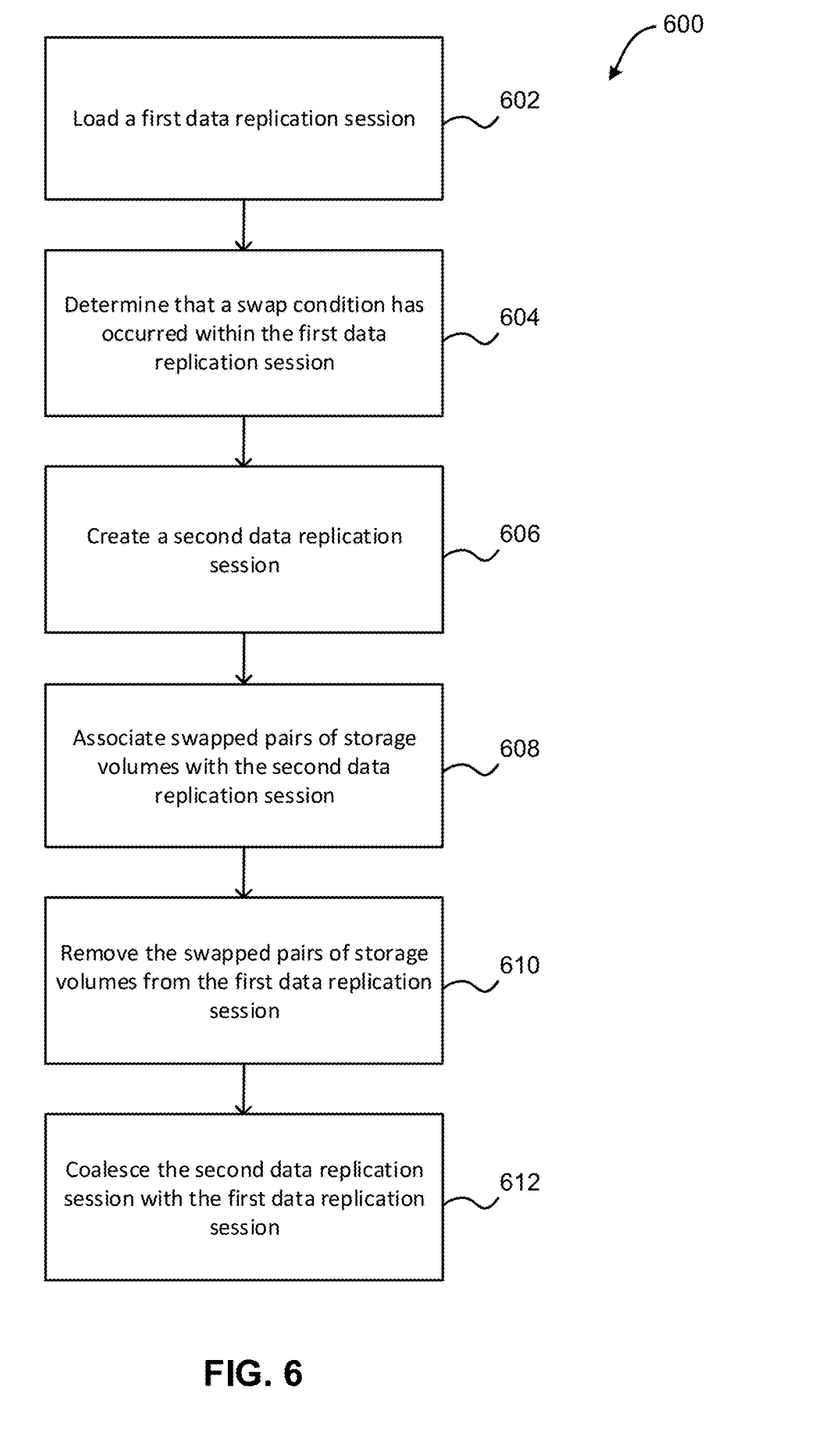
FIG. 6 illustrates a method for managing a swap condition, in accordance with one approach.

Now referring to FIG. 6, a flowchart of a method 600 for managing a swap condition is shown according to one approach. The method 600 may be performed in accordance with the present invention in any of the environments depicted in FIGS. 1-3 and 5A-C, among others, in various approaches. Of course, more or less operations than those specifically described in FIG. 6 may be included in method 600, as would be understood by one of skill in the art upon reading the present descriptions.

Each of the steps of the method 600 may be performed by any suitable component of the operating environment. For example, in various approaches, the method 600 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 600. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 6, method 600 may initiate with operation 602, where a first data replication session is loaded. In one approach, the first data replication session may implement data replication between pairs of storage volumes (e.g., source storage volumes and destination storage volumes). Additionally, method 600 may proceed with operation 604, where it is determined that a swap condition has occurred within the first data replication session. For example, the swap condition may include the failure of (or loss of access to) one or more of the source storage volumes within the first data replication session.

Further, method 600 may proceed with operation 606, where a second data replication session is created. In one approach, the second data replication session may include a temporary data replication session. Further still, method 600 may proceed with operation 608, where swapped pairs of storage volumes are associated with the second data replication session. For example, all pairs of storage volumes that include a failed source storage volume may be swapped and may be associated with the second data replication session.

Also, method 600 may proceed with operation 610, where the swapped pairs of storage volumes are removed from the first data replication session. In this way, two separate data replication sessions may be run simultaneously, where the first data replication session handles storage volumes not subject to the swap condition, and the second data replication session handles storage volumes that are subject to the swap condition.

In addition, method 600 may proceed with operation 612, where the second data replication session is coalesced with the first data replication session. For example, the swapped pairs of storage volumes handled by the second data replication session may be swapped a second time to obtain the original pairs of storage volumes existing before associated storage volume failures, and these original pairs of storage volumes may be added to the first data replication session. In one approach, the second data replication session may be removed. In another approach, the first data replication session may instead be coalesced with the second data replication session.

In this way, the first data replication session may be restored to its original state prior to the swap condition.

Method for OS Data Replication Session Split

Overview

In one approach, an automated way to split a session into multiple sub sessions may be implemented. This may allow the volumes on a storage system to remain in a data replication session replicating in the same direction, while only the volumes on the storage system that has an error are swapped. The application can then manage the two sessions separately as different entities. This may allow a user to decide whether they want to swap the rest of the volumes to the secondary site (e.g., at a more convenient time when there are more personnel available, etc.).

In one approach, the customer may decide to continue in this new "split" session configuration indefinitely. Upon a user confirmation, the sessions may then be "coalesced" or merged back into a single session. This action may automate the suspended recovery (or swap) of the initial direction session and then start in the opposite direction such that both sessions are now going in the same direction. This may be a pre-requisite for the sessions to be coalesced again into a single session.

Example Implementation

When the solution is notified that an operating system (OS) (e.g., zOS, etc.) has performed a swap for a storage system, the solution may automatically spawn off a new temporary session. The solution may determine what secondary volumes are now in a "failed over suspended primary state" and may add those volumes to the new temporary session and remove those same volumes from the original session by changing the database association. In another approach, the logical swap manager (e.g. HyperSwap, etc.) may pass the set of volume pairs that it has swapped to a copy services manager (CSM) upon completion of the swap.

This operation may occur internally via a database update, which would associate the copysets (e.g., storage volume pairings) from the original session to the new temporary session. The solution may respond to the swap event by only swapping copysets within the new temporary session and leaving the original session alone.

For example, using FIGS. 5A-C for reference, if a source storage system 504B has a problem, such that it triggers a swap event, only volumes within the source storage system 504B may be swapped. Volumes can continue to be copied from other source storage systems (e.g., source storage system 504A, source storage system 504N, etc.) to respective destination volumes (e.g., within destination storage system 506A, destination storage system 506N, etc.), while volumes within the problematic source storage system 504B are swapped to volumes within the paired destination storage system 506B.

After a swap is performed and a second data replication session 520 is automatically created, a customer may issue a start command to the second data replication session 520 to start copying in the opposite direction, whenever the original source storage system 504B is available to be used as a target.

Once the second data replication session 520 goes to prepared and its volumes are in full duplex, a new load may be initiated to the operating system, containing the relationships on volumes within the source storage system 504B and the destination storage system 506B.

The user may choose to continue running with the new configuration, with the first data replication session 502 and the second data replication session 520, and may also choose to manually swap the sessions individually. However, when the sessions are once again running in the same direction, this solution may coalesce the sessions into one session by another database update of the session associations effectively moving the volumes in the second data replication session 520 back in to the first data replication session 502 and removing the second data replication session 520. Regardless of whether there is only the first data replication session 502 or the first data replication session 502 and the second data replication session 520, only one IOS load would need to be done.

In the event that a full swap is desired for the whole first data replication session 502, the solution may issue a single swap load for the whole first data replication session 502 and may not create a second data replication session 520.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some approaches, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to approaches of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various approaches of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various approaches may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that approaches of the present invention may be provided in the form of a service deployed on behalf of a customer to offer service on demand.

While various approaches have been described above, it should be understood that they have been presented by way of example only, and not limitation. Thus, the breadth and scope of a preferred approach should not be limited by any of the above-described exemplary approaches, but should be defined only in accordance with the following claims and their equivalents.

What is claimed is:

1. A computer-implemented method, comprising:
identifying an inability to access a first storage volume during a first data replication session, where the first data replication session includes a plurality of source storage volumes including the first storage volume and a plurality of destination storage volumes;
creating a second data replication session including the first storage volume; and
maintaining the first data replication session and removing the first storage volume from the plurality of source storage volumes within first data replication session.

2. The computer-implemented method of claim 1, wherein the first storage volume is paired with a second storage volume within the first data replication session, wherein the first storage volume and the second storage volume are added to the second data replication session, wherein input and output requests from external systems and/or applications are directed to the second storage volume during the second data replication session, wherein data is replicated from the second storage volume to the first storage volume during the second data replication session.

3. The computer-implemented method of claim 1, wherein the first data replication session includes a data transfer session where data is replicated from the first storage volume of a first storage system to a second storage volume of a second storage system.

4. The computer-implemented method of claim 1, wherein data written to the first storage volume of a first storage system is replicated to a second storage volume of a second storage system during the first data replication session, wherein data written to the second storage volume is replicated to the first storage volume during the second data replication session.

5. The computer-implemented method of claim 1, wherein the second data replication session is created in response to the inability to access the first storage volume.

6. The computer-implemented method of claim 1, wherein the second data replication session is created in response to the inability to access the first storage volume, and a subsequent recovery of the first storage volume.

7. The computer-implemented method of claim 1, wherein the first storage volume is paired with a second storage volume within the first data replication session as a replication pairing, and the replication pairing is swapped within the second data replication session.

8. The computer-implemented method of claim 1, wherein the second data replication session includes a data transfer session where data is replicated from a second storage volume of a second storage system to the first storage volume of a first storage system.

9. The computer-implemented method of claim 1, wherein:
the first data replication session includes a plurality of destination storage volumes including a second storage volume, where the first storage volume is mapped to the second storage volume within the first data replication session,
the first data replication session includes a replication of data stored within the first storage volume to the second storage volume,
the first data replication session is created on a first operating system (OS) load, and the second data replication session is created on a second operating system (OS) load different from the first operating system (OS) load,
input and output (I/O) directed to the first storage volume is redirected to the second storage volume within the second data replication session, in response to identifying the inability to access the first storage volume,
the first storage volume and the second storage volume are added to the second data replication session in response to determining that access to the first storage volume has been restored, and the second data replication session includes a replication of data stored within the second storage volume to the first storage volume.

10. The computer-implemented method of claim 1, wherein:
the first data replication session includes a replication of data stored within the first storage volume to a second storage volume,
the first storage volume and the second storage volume are added to the second data replication session in response to determining that access to the first storage volume has been restored, and
the second data replication session includes a replication of data stored within the second storage volume to the first storage volume.

11. The computer-implemented method of claim 1, wherein:
the second data replication session is created in response to the inability to access the first storage volume, and a subsequent recovery of the first storage volume,
the first storage volume is paired with a second storage volume within the first data replication session as a replication pairing, and the replication pairing is swapped within the second data replication session, and
the first storage volume and a second storage volume are removed from the first data replication session, and added to the second data replication session, by changing one or more database associations; and
comprising merging the second data replication session with the first data replication session.

12. The computer-implemented method of claim 1, wherein:
the second data replication session is created in response to the inability to access the first storage volume, and a subsequent recovery of the first storage volume,
the first storage volume is paired with a second storage volume within the first data replication session as a replication pairing, and the replication pairing is swapped within the second data replication session, and
the first storage volume and a second storage volume are removed from the first data replication session, and added to the second data replication session, by changing one or more database associations.

13. A computer program product for managing data replication sessions in response to an inability to access a storage volume, the computer program product comprising a computer readable storage medium having program instructions embodied therewith, wherein the computer readable storage medium is not a transitory signal per se, the program instructions executable by a processor to cause the processor to perform a method comprising:
identifying, utilizing the processor, an inability to access a first storage volume during a first data replication session, where the first data replication session includes a plurality of source storage volumes including the first storage volume and a plurality of destination storage volumes;
creating, utilizing the processor, a second data replication session including the first storage volume; and
maintaining the first data replication session and removing the first storage volume from the plurality of source storage volumes within first data replication session, utilizing the processor.

14. The computer program product of claim 13, wherein the first storage volume is paired with a second storage volume within the first data replication session, wherein data written to the second storage volume is replicated to the first storage volume during the second data replication session.

15. The computer program product of claim 13, wherein the first data replication session includes a data transfer session where data is replicated from the first storage volume of a first storage system to a second storage volume of a second storage system.

16. The computer program product of claim 13, wherein data written (output) to and from the first storage volume of a first storage system is replicated to a second storage volume of a second storage system during the first data replication session, wherein the first storage volume and the second storage volume are added to the second data replication session, wherein input and output requests from external systems and/or applications are directed to the second storage volume during the second data replication session, wherein data written to the second storage volume during the second data replication session is replicated to a recovered version of the first storage volume.

17. The computer program product of claim 13, wherein the second data replication session is created in response to the inability to access the first storage volume.

18. The computer program product of claim 13, wherein the second data replication session is created in response to the inability to access the first storage volume, and a subsequent recovery of the first storage volume.

19. The computer program product of claim 13, wherein the first storage volume is paired with a second storage volume within the first data replication session as a replication pairing, and the replication pairing is swapped within the second data replication session.

20. A computer-implemented method, comprising:
identifying an inability to access a first storage volume during a first data replication session, where the first data replication session includes a plurality of source storage volumes including the first storage volume and a plurality of destination storage volumes, and the first storage volume is paired with a second storage volume within the first data replication session as a replication pairing;
in response to both the inability to access the first storage volume and a subsequent recovery of the first storage volume:
creating a second data replication session while maintaining the first data replication session,
removing the first storage volume and the second storage volume from the first data replication session, and adding the first storage volume and the second storage volume to the second data replication session, by changing one or more database associations, and
swapping the replication pairing within the second data replication session; and merging the second data replication session with the first data replication session.

* * * * *